No. 877,750. PATENTED JAN. 28, 1908.
W. G. WINDHAM.
MOTOR VEHICLE.
APPLICATION FILED JAN. 23, 1906.
6 SHEETS—SHEET 3.
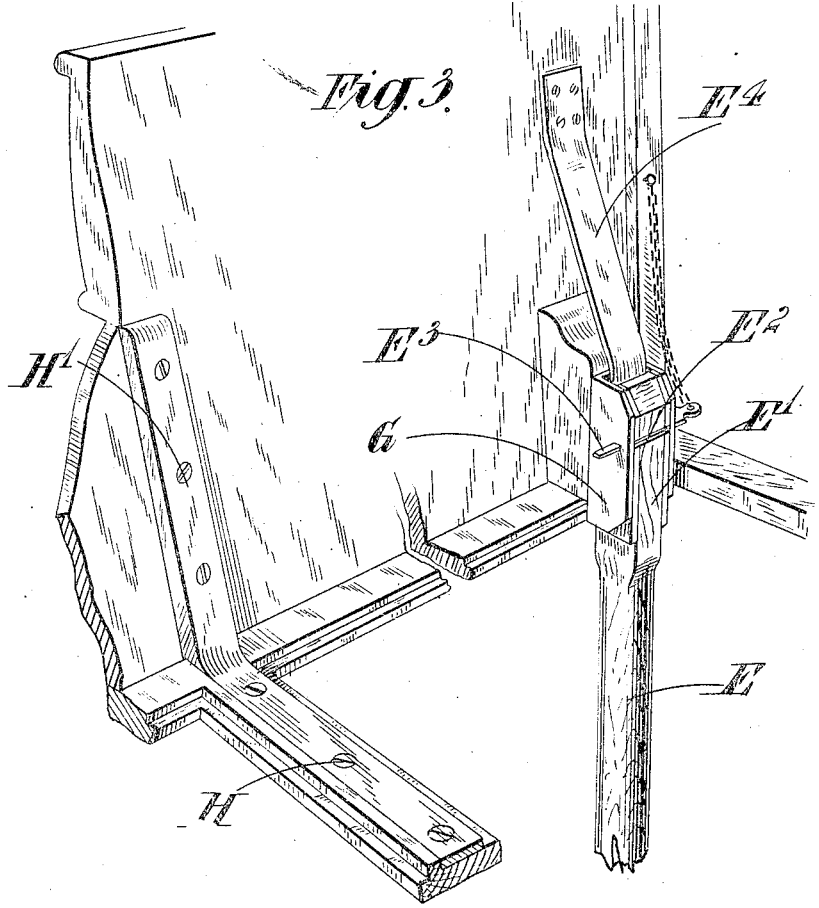
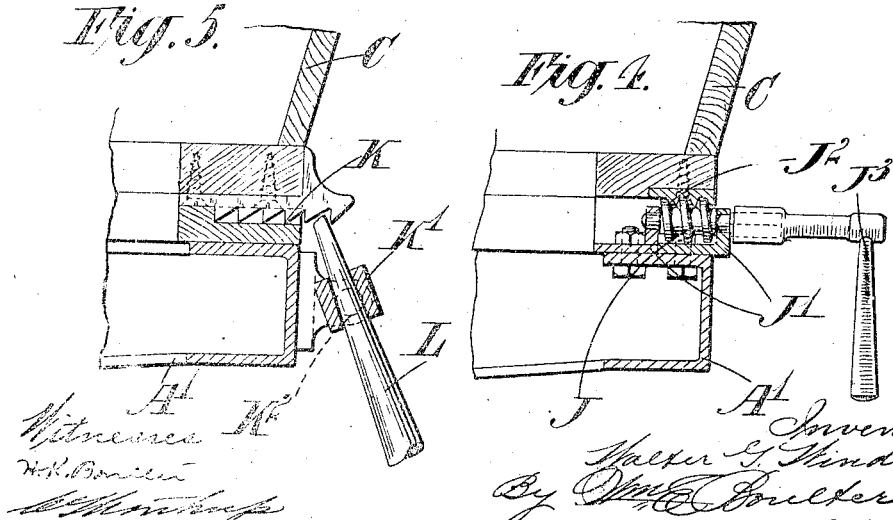

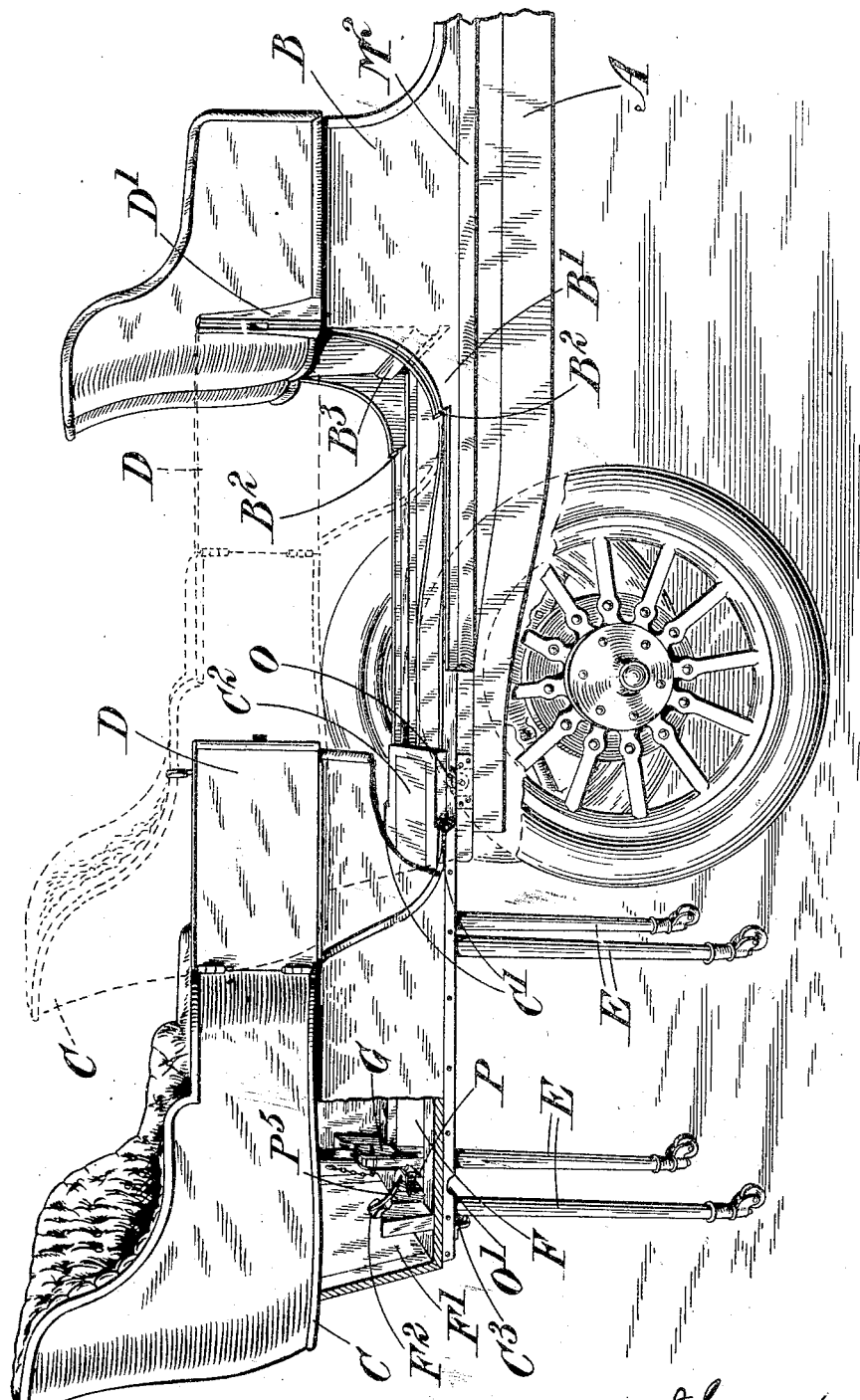

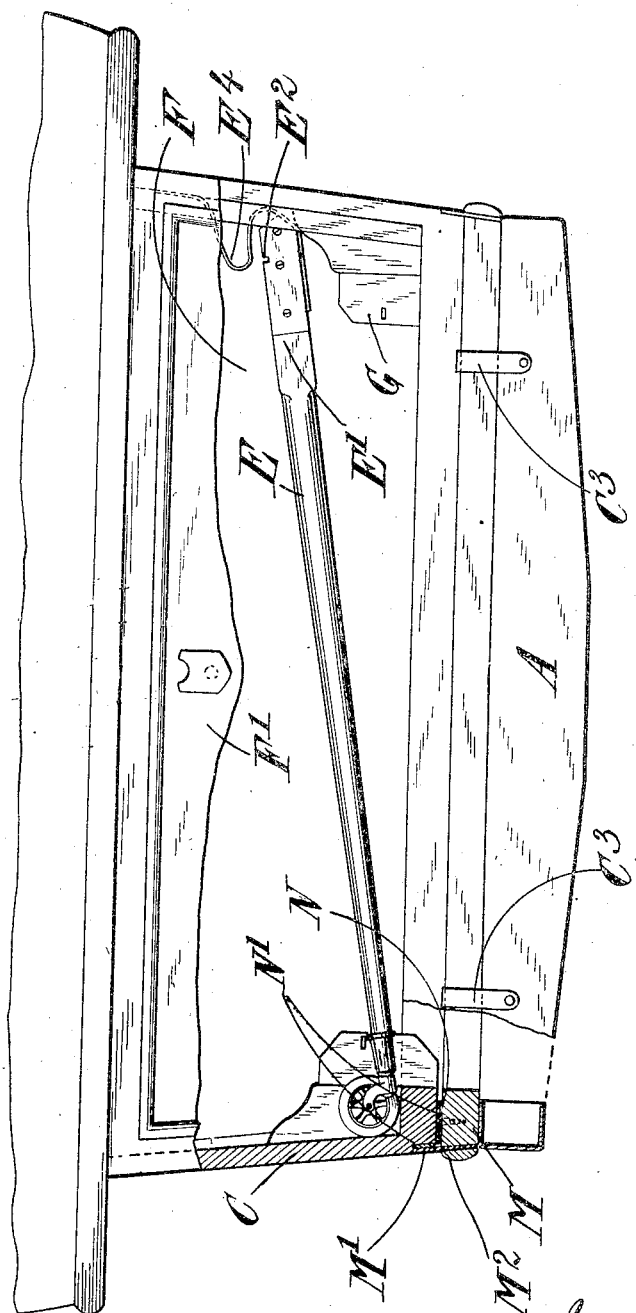

No. 877,750. PATENTED JAN. 28, 1908
W. G. WINDHAM.
MOTOR VEHICLE.
APPLICATION FILED JAN. 23, 1906.

6 SHEETS—SHEET 4.

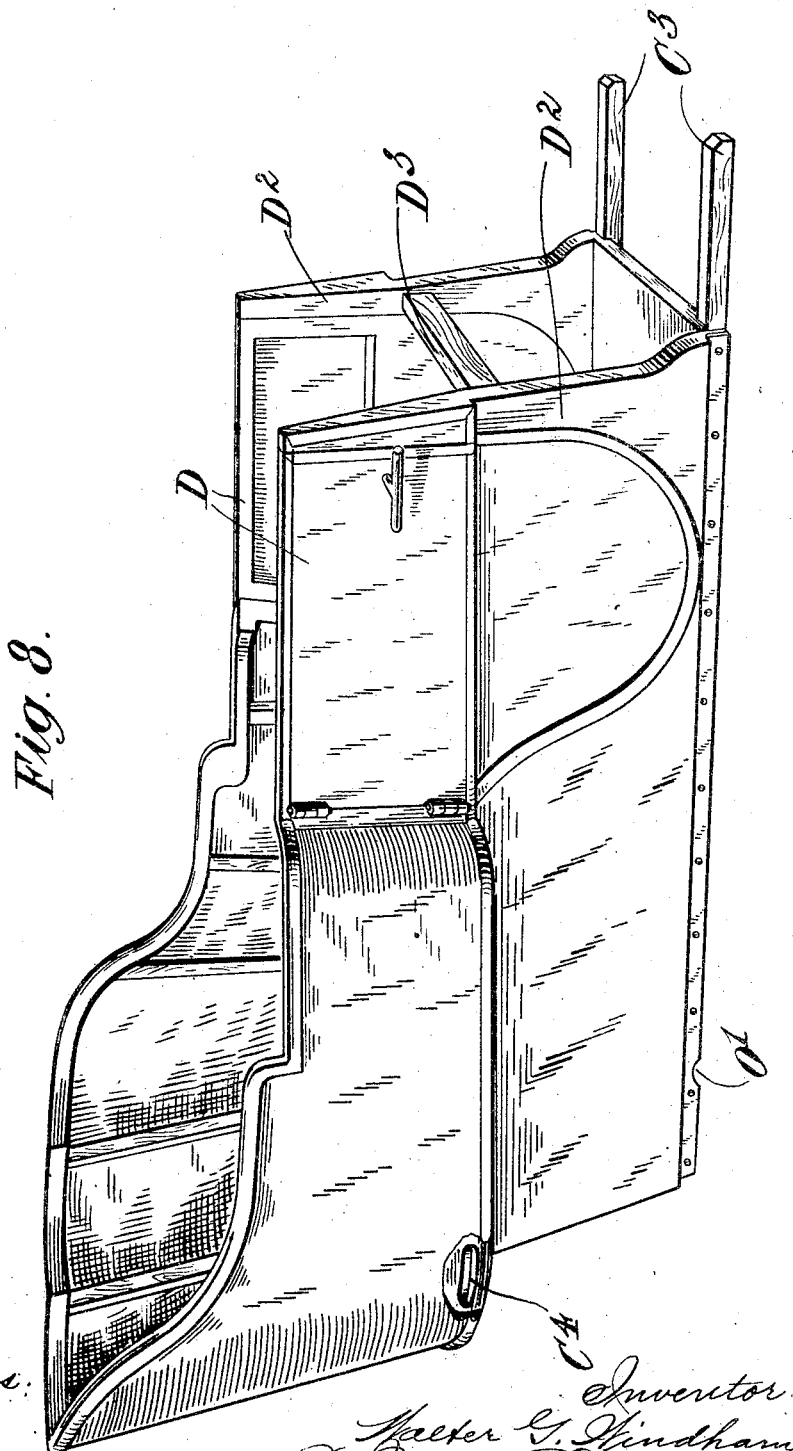

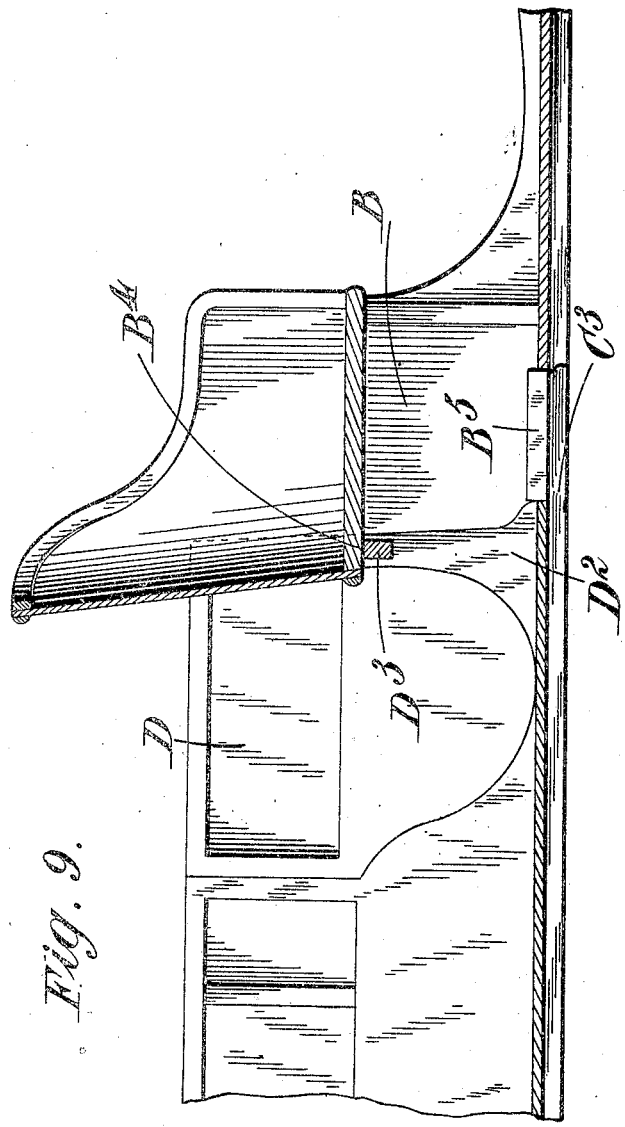

UNITED STATES PATENT OFFICE.

WALTER GEORGE WINDHAM, OF LONDON, ENGLAND.

MOTOR-VEHICLE.

No. 877,750.           Specification of Letters Patent.         Patented Jan. 28, 1908.

Application filed January 23, 1906. Serial No. 297,427.

*To all whom it may concern:*

Be it known that I, WALTER GEORGE WINDHAM, a subject of the King of England, residing at West Clapham Common, London, in the county of Surrey, England, have invented certain new and useful Improvements in or Relating to Motor-Vehicles, of which the following is a specification.

This invention relates to motor vehicles and has for its object to construct a rear half-body so that it can be readily removed and replaced with the minimum of labor while the appearance of the vehicle is in no way affected.

According to this invention the driver's seat is permanently secured to the chassis, while the rear half-body is mounted upon runners so that it can be slid rearwardly off the chassis. Legs are provided, preferably detachable, so that as the body slides from the chassis it may be supported by the legs whether removed entirely from the chassis or only projecting therefrom.

This invention also has reference to means for securing the detachable body portion against vertical displacement upon the chassis, and for locking it so that it cannot be withdrawn rearwardly without such locking device being first released; other details hereinafter fully described also constitute part of the same invention.

Figure 6:
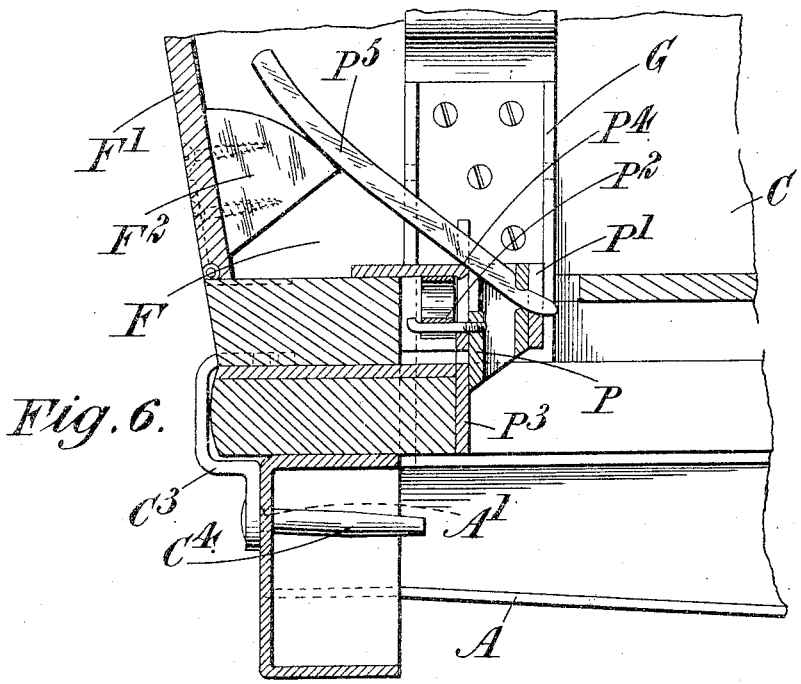
Figure 7:
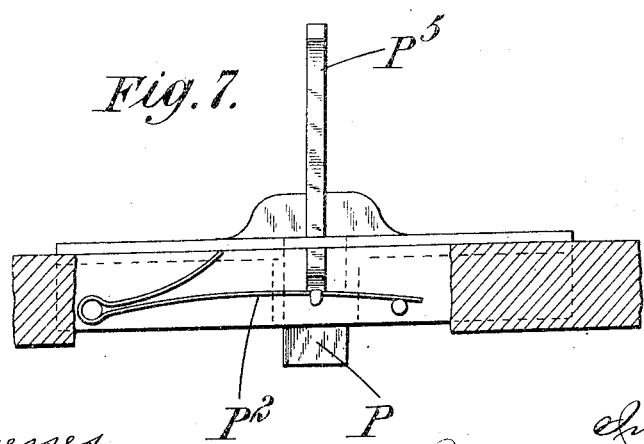

In the accompanying drawings, which illustrate one method of carrying out this invention, Figure 1 is a perspective view of the rear portion of a chassis with the detachable half-body removed to the end of the chassis and supported by the legs provided for this purpose; Fig. 2 is a rear elevation of the lower portion of the body and chassis; Fig. 3 is a perspective view of a detail within the lower portion of the body; Fig. 4 is a longitudinal section through the rear transverse member of the chassis and the parts immediately above it; Fig. 5 is a similar view showing a modified construction of these parts; Fig. 6 is a similar view to Figs. 4 and 5 showing other details of construction; Fig. 7 is a plan of the locking device shown in Fig. 6, Fig. 8 is a perspective view of a modified form of detachable half-body, and Fig. 9 is a central longitudinal section of the fore part of the vehicle with the modified half-body thereon.

Like letters indicate like parts throughout the drawings.

The frame or chassis A may be of any suitable construction and has permanently secured to it the driver's seat or front portion B of the body. The rear half-body C is, however, mounted on suitable runners so that it can be detached from the chassis by sliding it rearwardly thereon. Side doors D are provided in the body, these being hinged at the rear so that the forward ends latch against abutments D¹ secured to the fixed body-part B. The position of the body when home upon the chassis is clearly shown in Fig. 1 by dotted lines.

In order that the detachable half-body may be easily handled while being removed or replaced upon the chassis, legs E are provided. These may be secured to the body in any convenient manner, but are preferably so arranged that they may be dismounted from their pendent position when not in use. One or more of the legs are set as far to the rear of the body as possible so that as soon as the latter projects through the chassis, the leg or legs may be put in place ready to support the body. Any convenient number of legs may be provided, these being arranged in any position best adapted to take the weight of the body and support it when entirely removed from the chassis, as well as when only projecting therefrom.

A convenient means for securing the legs to the body and stowing them when not in use is shown in Figs. 2 and 3. In the rear of the vehicle and below the seat is a well F having a hinged door or panel F¹. On either side of this well and preferably close to the door a bracket G is mounted comprising a channel shaped socket adapted to receive the squared end E¹ of one of the legs E. In that face of each leg remote from the wall to which the bracket is secured is a notch or recess E² and in the bracket orifices are provided to receive a wedge-shaped pin E³. The leg is connected to the wall of the body by a strap E⁴ which is of such length that when the leg is dropped into position in the bracket, the notch E² registers with the orifices for the pin E³. The pin is then slipped into place and engaging the recessed portion of the leg wedges the leg back into the socket so that a rigid connection therewith is made.

When the legs are not in use they are removed from the sockets G and stowed crosswise in the well F. In this position the strap E⁴ supports one end, while the other rests upon the frame of the body, as clearly shown in Fig. 2.

To strengthen the removable half-body a transverse metal strut H having upwardly turned ends H¹ is conveniently secured therein. One end of the strut is shown in Fig. 3. The main portion H is secured to the frame of the body and the upwardly turned ends H¹ to opposite walls of the same.

It is necessary to provide means for holding the detachable body down upon the chassis when it is slid home thereon and also for preventing it from being displaced in a longitudinal direction. Means may also be provided for giving the operator some mechanical advantage when starting the body off the chassis, or for driving it home thereon.

A device of this kind is shown in Fig. 4 and comprises a worm J mounted in bearings J¹ on a transverse member A¹ of the chassis. Beneath the body C a skew rack J² of the same pitch as the worm is rigidly secured. A handle J³ is provided for rotating the worm and when the body is to be started the worm is first rotated in a clockwise direction so that the body is forced rearwardly. As soon as the rack leaves the worm the body, which will now slide more readily, can be pulled off the chassis by hand. The body is replaced by first sliding it onto the chassis until the rack abuts against the end of the worm when by rotating the latter in a counter clockwise direction the body may be forced home. This device in addition to serving as a starting and returning device for the body, also holds the latter when in position against endwise movement.

A more simple device for starting the body only is shown in Fig. 5. This comprises a rack K secured to the body C and a ring or socket K¹ pivoted at K² to a lug on the transverse member A¹ of the chassis. When it is desired to start the body from its seating, any suitable lever L may be inserted through the ring K so that its free end engages the rack. The body may in this manner be prized from its seating until the length of the rack is passed after which it can be pulled from the chassis without mechanical aid.

With a comparatively light body these starting devices are unnecessary.

The body may run upon wood or metal as desired, but metal to metal is found to give the best results and a preferred construction of runner is shown in section on the left hand side of Fig. 2. In this figure a wooden frame M is shown built upon the side frame members A of the chassis. To the side of the wooden member a metal flange plate M¹ is secured and this is in its turn partially covered by a wooden bead M². The plate or flange M¹ extends above the wooden portion of the runner and lies flush with the wall of the body C which is recessed to receive it. On the face of the wooden runner is a metal plate N and the opposed sliding parts of the body are also faced with metal as shown at N¹. A runner of this kind is placed on each side of the frame, and the flanges M¹ guide the body between them in its forward and rearward movements. The recesses which receive the flanges help to conceal the latter so that the general appearance is neat and scratching of the paint or varnish is avoided; the bead M² is ornamental only.

For the purpose of reducing friction between the body portion C and the runners when sliding it from the chassis, a roller O (Fig. 1) may be mounted on each side frame of the chassis towards the rear of the vehicle, the rollers being sufficiently above the level of the runners to receive the weight of the body. The corresponding runner portion on the body is recessed, as shown at O¹, so that when the body is home upon the chassis the recesses therein register with the rollers and allow the body to rest entirely upon the runners. A very slight rearward movement, however, brings the recesses out of register with the rollers so that the body rises upon the latter and can be thus easily withdrawn. Means are also provided for locking the body when home upon the chassis against vertical displacement. For this purpose the rearward extensions B¹ of the fixed body portion B constituting abutments against which the doors D close, are undercut as shown at B² and the corresponding portions C¹ of the body are beveled. It will thus be seen that when the body C is pushed home against the fixed part B, the beveled portions C¹ lie beneath the undercut parts B² and prevent vertical displacement. To further insure against vertical displacement, the foot board C² of the half-body may be adapted to extend under a rearward projection or batten B³ on the fixed body part B.

To prevent vertical displacement of the rear end of the half-body, pendent claws are secured to the latter each of which comprises a plate or bracket C³ carrying a forwardly projecting pin C⁴. The pins are adapted to engage sockets or orifices A¹ in the rear transverse member of the chassis, and the upper face of each pin is sloped so that as the body is pushed home upon the chassis, a wedging effect is obtained which draws the body tightly down upon the chassis.

As an alternative of the devices already described for preventing rearward displacement of the body, a sliding bolt or latch P may be employed. This is mounted in a suitable guide P¹ secured to the floor of the half-body C. The bolt slides vertically in its guide and is normally depressed by a spring P². When depressed it depends sufficiently below the floor of the body to engage a stop or plate P³ secured to the chassis, and as the bolt is situated in front of this plate, rearward movement of the half-body without first raising the bolt is impossible. A lever P⁵ is fulcrumed upon the base P⁴ of a slot in a suitable support on the floor of the body. One end of the lever engages the bolt P, while the other end extends rearwardly as a handle so that when depressed it raises the bolt free of the plate P³ against the action of its spring P². The lever P⁵ is accessible when the panel or door F¹ of the well F is lowered, and on the panel is secured a block F² adapted to lie beneath the lever P⁵ when the door F¹ is closed. The object of this arrangement is to insure that the lever P⁵ will not be depressed accidentally, as unless the door F¹ be first opened, the bolt P cannot be raised.

If desired, the front face of the plate P³ may be sloped as shown by the dotted line Fig. 6, so that should wear permit the body to be further advanced upon the chassis, the bolt can drop lower and engage the plate at a lower and therefore more advanced point. This insures against any end play between the front fixed portion of the body and the plate P³. It will be understood that the inclined face of the plate P³ is not sufficient to re-act upon the bolt and cause it to slide back against the pressure of its spring.

In Fig. 8 a detachable half-body is shown in which front supports D² are provided against which the doors close, instead of closing against the abutments D¹ on the fixed part of the body. This arrangement is advantageous in that it strengthens the fore part of the body and to further strengthen the same the supports are conveniently connected by a cross member or strut D³. All of these parts move with the half-body and conveniently the transverse member D³ is made to lie under a rearward extension B⁴ on the fixed body portion B, when the half-body is home upon the chassis; this arrangement further insures against vertical displacement of the fore part of the body.

On the body (Fig. 8) forwardly extending side members C³ are shown which, as the body is advanced along the chassis, slide beneath battens or other suitable projections B⁵ on the fixed body part. This allows the half-body to be partially withdrawn along the chassis, say for the purpose of inspecting the gear beneath the body, without the necessity of putting the legs in position. If extensions such as C³ were not provided, the body when withdrawn only a comparatively small distance from its normal position would be liable to tilt backwards, unless the legs were in place, but any such tilting is effectually prevented by the battens B⁵ so long as the extensions C³ are beneath them, and these may be made of any length desired.

At the rear of the detachable half-body hand holes such as C⁴ are provided. These, as shown in the drawing, are conveniently formed in the under side of the overhanging superstructure of the body and afford means by which the body may be readily handled without damage to the paint or varnish. One hole only is shown, but it will be understood that two are preferably provided at a convenient distance apart, one for each hand of the operator.

What I claim as my invention and desire to secure by Letters Patent is—

1. In a motor vehicle the combination of a chassis, a front seat secured thereto and suitably disposed for the driver, longitudinal runners on the chassis, and a rear half-body detachable from the chassis by sliding rearwardly upon the runners, substantially as set forth.

2. In a motor vehicle the combination of a chassis, a front seat secured thereto, longitudinal runners on the chassis, a rear half-body detachable from the chassis by sliding rearwardly upon the runners, legs to support the half-body when projecting beyond or entirely removed from the chassis, substantially as set forth.

3. In a motor vehicle the combination of a chassis, a front seat secured thereto, longitudinal runners on the chassis, a rear half-body detachable from the chassis by sliding rearwardly on the runners, legs to support the half-body when projecting beyond or entirely removed from the chassis, and means for dismounting the legs from their pendent position upon the body when the latter is home upon the chassis, substantially as set forth.

4. In a motor vehicle the combination of a chassis, a front seat secured thereto, longitudinal runners on the chassis, a rear half-body detachable from the chassis by sliding rearwardly upon the runners, and detachable legs to support the half-body when projecting beyond or entirely removed from the chassis, substantially as set forth.

5. In a motor vehicle the combination of longitudinal wood runners, flanges M¹ secured to the outer side of the wood runners and projecting in a vertical plane therefrom, a chassis or relatively stationary element, a rear half-body or relatively movable element detachable from the chassis by sliding rearwardly upon the runners, means for securing the runners with their flanges M¹ to one of these elements so that the flanges enter recesses in the corresponding element and lie flush therewith, and a front seat secured to the chassis, substantially as set forth.

6. In a motor vehicle the combination of a chassis, a front seat secured thereto, longitudinal runners on the chassis, a rear half-body detachable from the chassis by sliding rearwardly upon the runners, side doors to the detachable half-body hinged at the rear, and means for latching the forward ends of the doors, substantially as set forth.

7. In a motor vehicle the combination of a chassis, a front seat secured thereto, longitudinal runners on the chassis, a rear half-body detachable from the chassis by sliding rearwardly upon the runners, side doors to the detachable half-body hinged at the rear, upwardly extending supports secured to the forward end of the detachable half-body and situated in advance of the doors so that these close against the supports, and means for latching the doors thereto, substantially as set forth.

8. In a motor vehicle the combination of a chassis, a front seat secured thereto, longitudinal runners on the chassis, a rear half-body detachable from the chassis by sliding rearwardly upon the runners, upwardly extending supports secured to the forward end of the detachable body, side doors hinged to the detachable half-body to the rear of the forward supports, and a transverse member connecting the supports, substantially as set forth.

9. In a motor vehicle the combination of a chassis, a front seat secured thereto, longitudinal runners on the chassis, a rear half-body detachable from the chassis by sliding rearwardly upon the runners, upwardly extending supports secured to the forward end of the detachable body, side doors hinged to the detachable half-body to the rear of the forward supports, a transverse member connecting the supports, and a rearward projection on the fixed body portion beneath which this transverse member is brought when the detachable half-body is home upon the chassis so that the body is locked against vertical movement, substantially as set forth.

10. In a motor vehicle the combination of a chassis, a front seat secured thereto, longitudinal runners on the chassis, a rear half-body detachable from the chassis by sliding rearwardly upon the runners, and a device by which a purchase may be obtained for moving the body in a longitudinal direction upon the chassis, substantially as set forth.

11. In a motor vehicle the combination of a chassis, a front seat secured thereto, longitudinal runners on the chassis, a rear half-body detachable from the chassis by sliding rearwardly upon the runners, a worm, bearings in which the worm may be rotated, a rack or nut-portion to coöperate with the worm, means for securing one of these coöperating parts to the detachable body portion of the vehicle and the other to some fixed part of the same, and means for rotating the worm for the purpose of starting the body from the chassis or forcing it home thereon, substantially as set forth.

12. In a motor vehicle the combination of a chassis, a front seat secured thereto, longitudinal runners on the chassis, a rear half-body detachable from the chassis by sliding rearwardly upon the runners, and rollers at the rear of the chassis to support the body as it is withdrawn therefrom, the body being provided with recesses to receive the rollers when home upon the chassis so that normally it does not rest upon them, substantially as set forth.

13. In a motor vehicle the combination of a chassis, a front seat secured thereto, longitudinal runners on the chassis, a rear half-body detachable from the chassis by sliding rearwardly upon the runners, a forwardly projecting member at the rear of the detachable half-body, and means on some fixed portion of the vehicle to receive this forwardly projecting member, one of these parts being provided with an inclined face so that as the half-body is pushed home upon the chassis its rear is drawn down upon the chassis by the resulting wedge-like action, substantially as set forth.

14. In a motor vehicle the combination of a chassis, a front seat secured thereto, longitudinal runners on the chassis, a rear half-body detachable from the chassis by sliding rearwardly upon the runners, and a pendent claw secured to the rear of the detachable half-body and adapted to enter a socket in the chassis, the claw having an inclined upper face so that as the half-body is driven home upon the chassis it is drawn down and locked against vertical movement, substantially as set forth.

15. In a motor vehicle the combination of a chassis, a front seat secured thereto, longitudinal runners on the chassis, a rear half-body detachable from the chassis by sliding rearwardly upon the runners and having hand holes at the rear, substantially as set forth.

16. In a motor vehicle the combination of a chassis, a front seat secured thereto, longitudinal runners on the chassis, a rear half-body detachable from the chassis by sliding rearwardly upon the runners, a vertically sliding bolt carried by the half-body, a stop on the chassis situated to the rear of the bolt when the body is home upon the chassis and with which the bolt engages so that rearward movement of the half-body is prevented, a lever for raising the bolt out of the path of this stop to permit rearward movement of the body, a hinged panel at the rear of the body by which access may be had to the lever, and means operatively connecting the hinged panel with the lever so that when the panel is closed the lever is locked in such position as to maintain the bolt in engagement with the chassis, substantially as set forth.

17. In a motor vehicle the combination of a chassis, a front seat secured thereto, longitudinal runners on the chassis, a rear half-body detachable from the chassis by sliding rearwardly upon the runners, a vertically sliding bolt carried by the half-body a stop on the chassis situated to the rear of the bolt when the body is home upon the chassis, the stop having an inclined face so that its lower end advances towards the front of the vehicle; the bolt being arranged in the path of the stop so that rearward movement of the half-body is prevented thereby and means for raising the bolt out of the path of the stop, substantially as set forth.

18. In a motor vehicle the combination of a chassis, a front seat secured thereto, longitudinal runners on the chassis, a rear half-body detachable from the chassis by sliding rearwardly upon the runners, forwardly extending side members on the half-body and corresponding members on a fixed portion of the vehicle situated above the extensions on the body so that the latter can be withdrawn a given distance without release of the forward end in a vertical direction, substantially as set forth.

19. In a motor vehicle the combination of a chassis, a front seat secured thereto, longitudinal runners on the chassis, a rear half-body detachable from the body by sliding rearwardly upon the runners, a tie H secured to the floor of the half-body, and upward extensions H¹ on the tie secured to the walls of the half-body, substantially as set forth.

In testimony whereof I have signed my name to this specification in the presence of two subscribing witnesses.

WALTER GEORGE WINDHAM.

Witnesses:
WILLIAM H. BALLANTYNE,
A. M. HAYWARD.